(12) United States Patent
Ramakrishnan et al.

(10) Patent No.: US 11,996,118 B2
(45) Date of Patent: May 28, 2024

(54) SELECTION OF SPEECH SEGMENTS FOR TRAINING CLASSIFIERS FOR DETECTING EMOTIONAL VALENCE FROM INPUT SPEECH SIGNALS

(71) Applicant: Tata Consultancy Services Limited, Mumbai (IN)

(72) Inventors: Ramesh Kumar Ramakrishnan, Bangalore (IN); Venkata Subramanian Viraraghavan, Bangalore (IN); Rahul Dasharath Gavas, Bangalore (IN); Sachin Patel, Pune (IN); Gauri Deshpande, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 350 days.

(21) Appl. No.: 17/504,556

(22) Filed: Oct. 19, 2021

(65) Prior Publication Data
US 2022/0130414 A1    Apr. 28, 2022

(30) Foreign Application Priority Data
Oct. 22, 2020  (IN) .............................. 202021046176

(51) Int. Cl.
*G10L 25/63*     (2013.01)
*G06N 20/00*     (2019.01)
(Continued)

(52) U.S. Cl.
CPC .............. *G10L 25/63* (2013.01); *G06N 20/00* (2019.01); *G10L 15/04* (2013.01); *G10L 25/27* (2013.01)

(58) Field of Classification Search
CPC ..................................................... G10L 26/36
See application file for complete search history.

(56) References Cited

U.S. PATENT DOCUMENTS 9,788,777 B1 * 10/2017 Knight ............... G06Q 30/0269
11,132,993 B1 *  9/2021 McDaniel ........... G10L 15/1807

FOREIGN PATENT DOCUMENTS

WO    WO 2008/092474 A1    8/2008

OTHER PUBLICATIONS

Dzedzickis et al., "Human Emotion Recognition: Review of Sensors and Methods," Sensors, 20, 592 (2020).

(Continued)

*Primary Examiner* — Paras D Shah
*Assistant Examiner* — Kristen Michelle Masters
(74) *Attorney, Agent, or Firm* — FINNEGAN, HENDERSON, FARABOW, GARRETT & DUNNER, LLP

(57) ABSTRACT

An important task in several wellness applications is detection of emotional valence from speech. Two types of features of speech signals are used to detect valence: acoustic features and text features. Acoustic features are derived from short frames of speech, while text features are derived from the text transcription. Present disclosure provides systems and methods that determine the effect of text on acoustic features. Acoustic features of speech segments carrying emotion words are to be treated differently from other segments that do not carry such words. Only specific speech segments of the input speech signal are considered based on a dictionary specific to a language to assess emotional valence. A model trained (or trained classifier) for specific language either by including the acoustic features of the emotion related words or by omitting it is used by the system for determining emotional valence in an input speech signal.

9 Claims, 3 Drawing Sheets

(51) Int. Cl.
*G10L 15/04* (2013.01)
*G10L 25/27* (2013.01)

(56) References Cited

OTHER PUBLICATIONS

Kamé inska, "Emotional Speech Recognition Based on the Committee of Classifiers," Entropy, 21, 920 (2019).

* cited by examiner

SELECTION OF SPEECH SEGMENTS FOR TRAINING CLASSIFIERS FOR DETECTING EMOTIONAL VALENCE FROM INPUT SPEECH SIGNALS

PRIORITY CLAIM

This U.S. patent application claims priority under 35 U.S.C. § 119 to: India Application No. 202021046176, filed on Oct. 22, 2020. The entire contents of the aforementioned application are incorporated herein by reference.

TECHNICAL FIELD

The disclosure herein generally relates to speech signal analysis, and, more particularly, to selection of speech segments for training classifiers for detecting emotional valence from input speech signals.

BACKGROUND

Emotional wellbeing, an important aspect of mental wellbeing, is the emotional aspect of everyday experience. Several organizations and enterprises have increased attention on emotional well-being at the workplace. Emotions are expressed by humans through multiple modes, such as facial expressions, speech and body language, in general. Emotion is commonly measured using up to five dimensions, which use models such as valence, and the like. An important task in understanding an individual's mental state is detecting their valence, and the like from speech.

Emotion in speech may be detected from samples of speech as short as exclamations or even long sentences. For training machine learning/deep learning algorithms, emotion may be annotated continuously or on larger chunks depending on the context. For example, if a person is narrating a happy event, all sentences in the narration can be annotated as happy. In these situations, the typical approach is to split long signals into many shorter segments that share the ground truth of the source speech. However, it has been observed that, segments of a story do not always carry the same emotion as the overall story in real-world scenarios. For example, a happy or sad story may be interspersed with segments of neutral emotion which may result in an inaccurate valence detection.

SUMMARY

Embodiments of the present disclosure present technological improvements as solutions to one or more of the above-mentioned technical problems recognized by the inventors in conventional systems. For example, in one aspect, there is provided a processor implemented method for selection of speech segments for training classifiers for detecting emotional valence from input speech signals. The method comprises obtaining, via one or more hardware processors, (i) a speech signal corresponding to one or more users, and (ii) a corresponding text transcription from the speech signal; splitting, via the one or more hardware processors, the speech signal to a plurality of speech segments; determining, via the one or more hardware processors, one of (i) one or more emotion words-based speech segments, or (ii) one or more non-emotion words-based speech segments from the plurality of speech segments based on (a) the speech signal, (b) the obtained text transcription, and (c) a language specific emotion words-based dictionary; selecting, via the one or more hardware processors, one or more training segments from the plurality of speech segments based on (i) one or more emotion words-based speech segments, or (ii) the one or more non-emotion the words-based speech segments; and training, via the one or more hardware processors, one or more classifiers using the one or more selected training segments to obtain one or more trained classifiers.

In an embodiment, the method further comprises measuring performance and accuracy of each of the one or more trained classifiers.

In an embodiment, the one or more training segments comprise the one or more emotion words-based speech segments.

In an embodiment, the one or more training segments comprise the one or more non-emotion words-based speech segments.

In an embodiment, the method further comprises receiving an input speech corresponding to a user; and determining, via the one or more trained classifiers, an emotional valence of the user using the input speech.

In another aspect, there is provided a processor implemented system for selection of speech segments for training classifiers for detecting emotional valence from input speech signals. The system comprises: a memory storing instructions; one or more communication interfaces; and one or more hardware processors coupled to the memory via the one or more communication interfaces, wherein the one or more hardware processors are configured by the instructions to: obtain (i) a speech signal corresponding to one or more users, and (ii) a corresponding text transcription from the speech signal; split the speech signal to a plurality of speech segments; determine one of (i) one or more emotion words-based speech segments, or (ii) one or more non-emotion words-based speech segments from the plurality of speech segments based on (a) the speech signal, (b) the obtained text transcription, and (c) a language specific emotion words-based dictionary; select one or more training segments from the plurality of speech segments based on (i) one or more emotion words-based speech segments, or (ii) the one or more non-emotion the words-based speech segments; and train one or more classifiers using the one or more selected training segments to obtain one or more trained classifiers.

In an embodiment, the one or more hardware processors are further configured by the instructions to measure performance and accuracy of each of the one or more trained classifiers.

In an embodiment, the one or more training segments comprise the one or more emotion words-based speech segments.

In an embodiment, the one or more training segments comprise the one or more non-emotion words-based speech segments.

In an embodiment, the one or more hardware processors are further configured by the instructions to receive an input speech corresponding to a user; and determine, via the one or more trained classifiers, an emotional valence of the user using the input speech.

In yet another aspect, there are provided one or more non-transitory machine-readable information storage mediums comprising one or more instructions which when executed by one or more hardware processors cause a method for selection of speech segments for training classifiers for detecting emotional valence from input speech signals. The method comprises obtaining, via the one or more hardware processors, (i) a speech signal corresponding to one or more users, and (ii) a corresponding text transcription from the speech signal; splitting, via the one or more hardware processors, the speech signal to a plurality of speech segments; determining, via the one or more hardware processors, one of (i) one or more emotion words-based speech segments, or (ii) one or more non-emotion words-based speech segments from the plurality of speech segments based on (a) the speech signal, (b) the obtained text transcription, and (c) a language specific emotion words-based dictionary; selecting, via the one or more hardware processors, one or more training segments from the plurality of speech segments based on (i) one or more emotion words-based speech segments, or (ii) the one or more non-emotion the words-based speech segments; and training, via the one or more hardware processors, one or more classifiers using the one or more selected training segments to obtain one or more trained classifiers.

In an embodiment, the method further comprises measuring performance and accuracy of each of the one or more trained classifiers.

In an embodiment, the one or more training segments comprise the one or more emotion words-based speech segments.

In an embodiment, the one or more training segments comprise the one or more non-emotion words-based speech segments.

In an embodiment, the method further comprises receiving an input speech corresponding to a user; and determining, via the one or more trained classifiers, an emotional valence of the user using the input speech.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
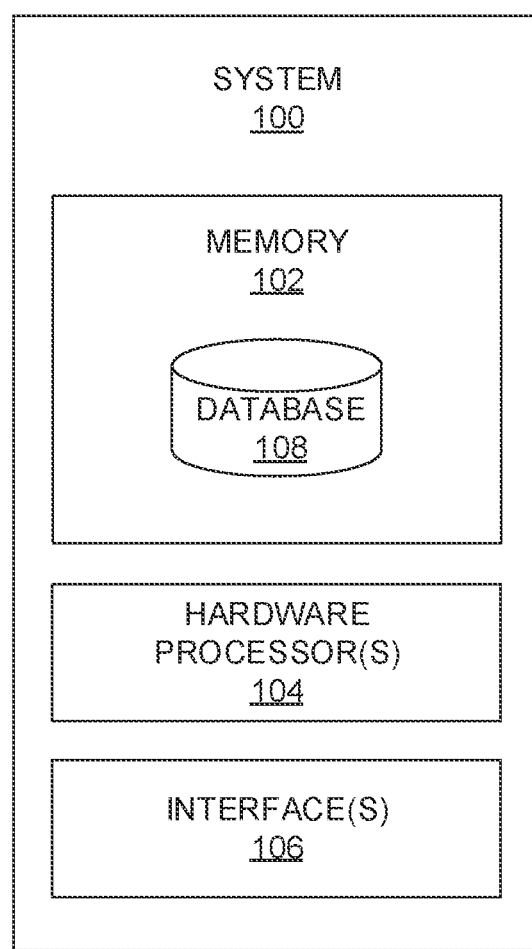
FIG. 1 depicts a system for selection of speech segments for training classifiers for detecting emotional valence from input speech signals, in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Machine-learning for detecting valence from speech follows the typical process of building classifiers on extracted features. The ground truth associated with speech samples is provided by human observers/experts or is self-assessed. Some recently used examples of acoustic features are OpenSMILE, OpenXBoAW, time-domain differences, etc. Deep networks are being used increasingly, but hand-crafted features are still relevant. End-to-end approaches use time-domain audio samples or spectrograms as inputs for classification.

From the current state of the art, it appears that detecting valence from speech alone has limitations in classification performance. Thus, multi-modal detection approaches have been proposed; a thorough review is done in some research works. Specifically, the combination of speech-features and text-features has shown promise in valence detection.

Valence detection from speech and annotated text usually assumes that there is emotion information in the acoustic features, and in the text features, especially in words related to emotion, such as happy, sad, etc. In the Emo-DB, neutral sentences had to be spoken with different emotions so that text features were unlikely to carry their own emotion. In lexical compensation, acoustic features are compensated for the variability in words/sounds by synthesizing the entire speech. This compensation does not consider emotion words separately. A recent work challenges the view that there is no inherent emotion information in phones. The authors show that phonetic (acoustic) features influence valence: e.g., words with hissing sibilants ('sss') feel more negative. In the present disclosure, systems and method are provided for selection of speech segments for generating training dataset which are then used for training classifiers for detecting emotional valence from input speech signals. The training dataset consists of one or more select speech segments with or without emotion words, wherein effect of emotion words on valence detection is studied. More specifically, input speech signal and corresponding text transcription pertaining to a user is obtained by the system. The system of the present disclosure further splits the input speech signal into a plurality of speech segments wherein based on the input speech signal, the text transcription and a language specific emotion words-based dictionary, one or more emotion words-based speech segments and/or one or more non-emotion words-based speech segments are determined. Further, based on the one or more emotion words-based speech segments or one or more non-emotion words-based speech segments, one or more training speech segments are selected/identified which are used for training one or more classifiers. The one or more trained classifiers are then executed for an input test speech signal (or input speech signal containing audio speech) and an emotional valence of the input test speech signal of the user is detected.

Figure 2:
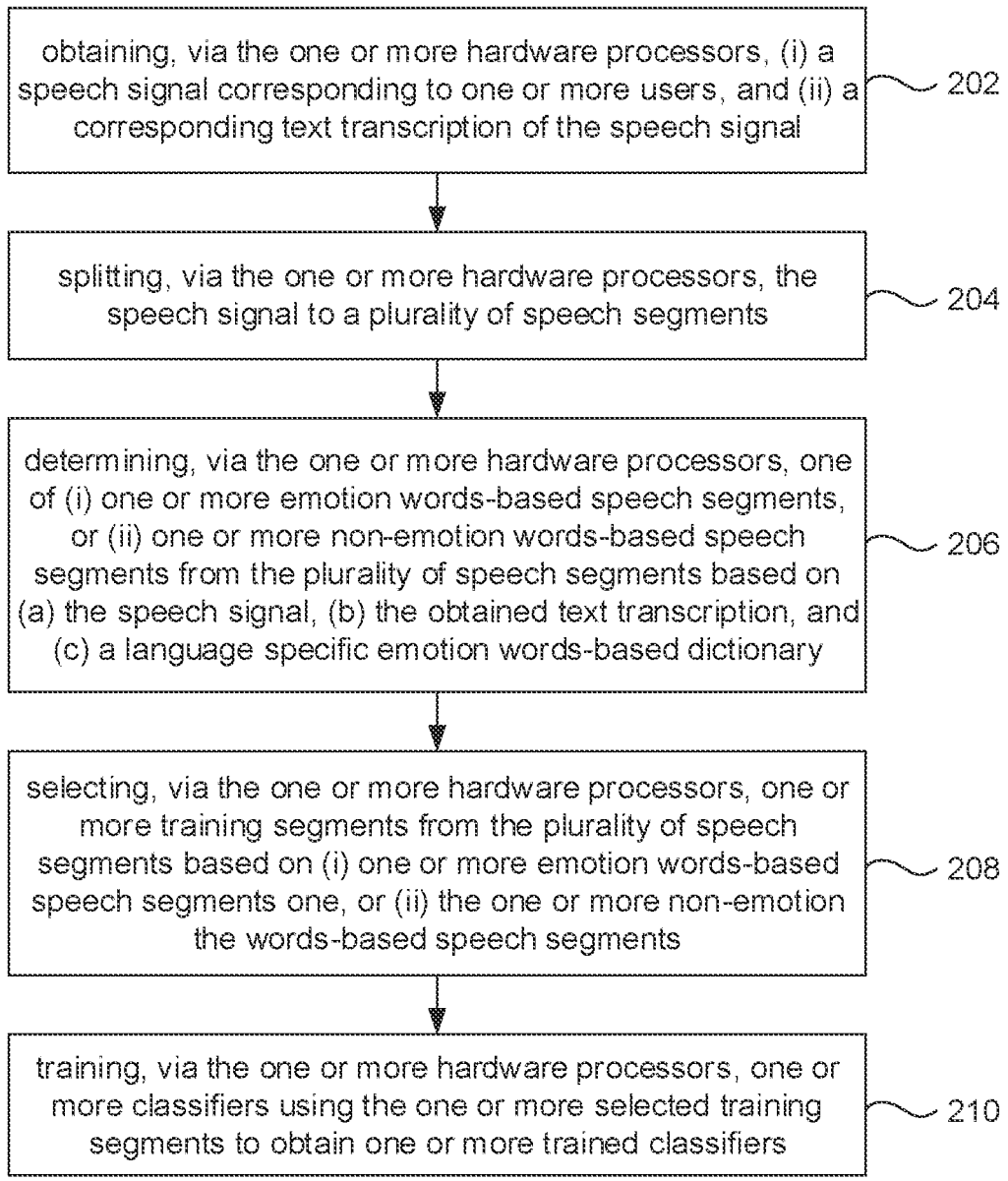
FIG. 2 depicts an exemplary flow chart illustrating a method for selection of speech segments for training classifiers for detecting emotional valence from input speech signals, using the system of FIG. 1 in accordance with an embodiment of the present disclosure.
Figure 3:
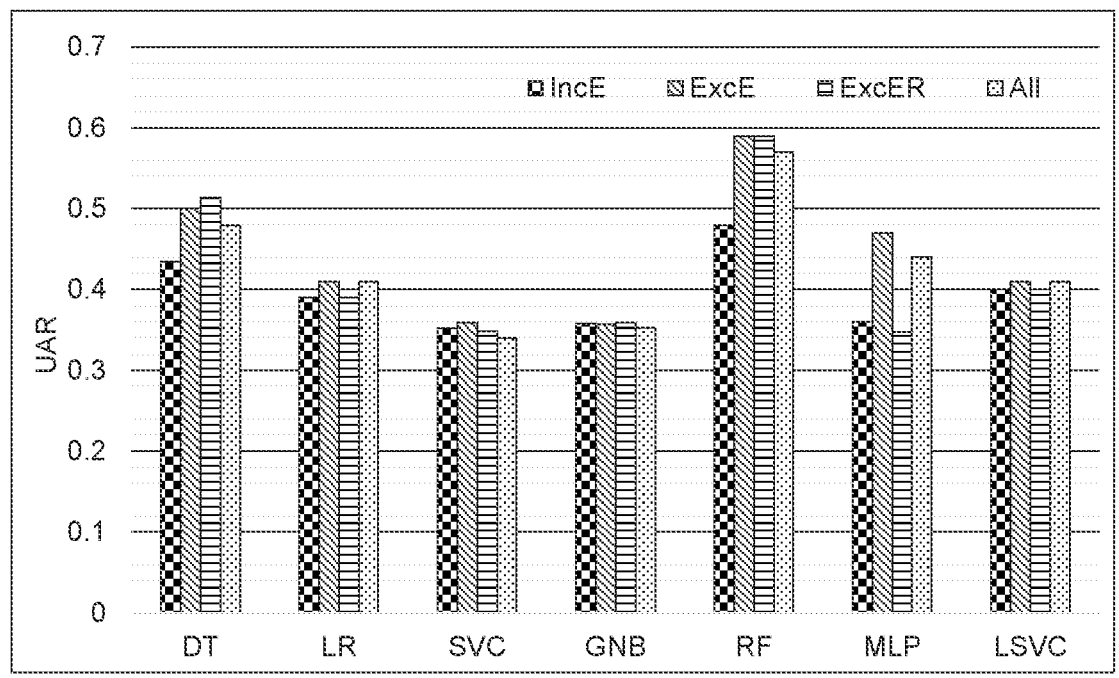
FIG. 3 illustrates a graphical representation depicting performance measurement (unweighted average call—UAR) for one or more classifiers, using the system of FIG. 1, in accordance with an embodiment of the present disclosure.

Referring now to the drawings, and more particularly to FIGS. 1 through 3, where similar reference characters denote corresponding features consistently throughout the figures, there are shown preferred embodiments and these embodiments are described in the context of the following exemplary system and/or method.

FIG. 1 depicts a system 100 for selection of speech segments for training classifiers for detecting emotional valence from input speech signals, in accordance with an embodiment of the present disclosure. In an embodiment, the system 100 includes one or more hardware processors 104, communication interface device(s) or input/output (I/O) interface(s) 106 (also referred as interface(s)), and one or more data storage devices or memory 102 operatively coupled to the one or more hardware processors 104. The one or more processors 104 may be one or more software processing components and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is/are configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, a database 108 is comprised in the memory 102, wherein the database 108 comprises speech signals and corresponding text transcription of one or more users. The database 108 further stores speech segments that are obtained from splitting input speech signals.

The database 108 further stores information such as one or more language specific emotion words-based dictionary, one or more emotion words-based speech segments, one or more non-emotion words-based speech segments Information stored in the database 108 further comprises speech segments selected and serving as a training dataset for training one or more classifiers. The classifiers comprised in the memory 102/database 108 are invoked as per the requirement by the system 100 to perform the methodologies described herein. For instance, the system 100 stores say support vector machine (SVM) or random forest (RF) type classifiers which may be invoked for execution of the method of the present disclosure for emotional valence detection of user for a given input speech signal (e.g., a test speech signal). The memory 102 further comprises (or may further comprise) information pertaining to input(s)/output(s) of each step performed by the systems and methods of the present disclosure. In other words, input(s) fed at each step and output(s) generated at each step are comprised in the memory 102 and can be utilized in further processing and analysis.

FIG. 2, with reference to FIG. 1, depicts an exemplary flow chart illustrating a method for selection of speech segments for training classifiers for detecting emotional valence from input speech signals, using the system 100 of FIG. 1 in accordance with an embodiment of the present disclosure. In an embodiment, the system(s) 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to components of the system 100 of FIG. 1, and the flow diagram as depicted in FIG. 2. In an embodiment, at step 202 of the present disclosure, the one or more hardware processors 104 obtain (i) a speech signal corresponding to one or more users, and (ii) a corresponding text transcription of the speech signal. For instance, say, 'John Doe' a user's audio speech signal is recorded or obtained wherein the speech signal is indicative of describing his experience of being part of a charity drive. The corresponding text transcription is provided by way of example and such example shall not be construed as limiting the scope of the present disclosure.

Text Transcription: "When I got involved in the charity program, I got to understand the day to day life of these people. It made me sad. I felt angry that all these days they were ignored while we had the opportunity to make a difference. Just talking to them made them happy. We then created this program where we have over 1000 volunteers who have earned the trust of patrons as well as the beneficiaries. The apprehensions of initial days are now replaced with joy and optimism"

At step 204 of the present disclosure, the one or more hardware processors 104 split the speech signal to a plurality of speech segments. In the above example text transcription paragraph, each sentence is a speech segment. Example of speech segments of the above text transcription are provided below:

Text Transcription Segment 1: "When I got involved in the charity program, I got to understand the day to day life of these people."

Text Transcription Segment 2: "It made me sad."

Text Transcription Segment 3: "I felt angry that all these days they were ignored while we had the opportunity to make a difference."

Text Transcription Segment 4: "Just talking to them made them happy."

Text Transcription Segment 5; "We then created this program where we have over 1000 volunteers who have earned the trust of patrons as well as the beneficiaries."

Text Transcription Segment 6: "The apprehensions of initial days are now replaced with joy and optimism."

It is to be understood by a person having ordinary skill in the art or person skilled in the art that the input speech signal corresponds to the text transcription as mentioned above.

At step 206 of the present disclosure, the one or more hardware processors 104 determine one of (i) one or more emotion words-based speech segments, or (ii) one or more non-emotion words-based speech segments from the plurality of speech segments based on (a) the speech signal, (b) the obtained text transcription, and (c) a language specific emotion words-based dictionary. In an embodiment, the language specific emotion words-based dictionary is created/generated or populated by the system 100 based on one or more of (i) standard Plutchik's wheel of emotion words as known in the art, (ii) associated synonyms and forms (predicative, adverbs, attributive, comparative, noun forms) obtained from the standard Plutchik's wheel of emotion words, (iii) selection of relevant words from the text transcription of the input speech signal, and the like, wherein the relevant words are either positive or negative emotion words (such as happy, joy, sad, anger, and the like). The language specific emotion words-based dictionary can be pre-generated and comprised in the memory 102 for the input speech signal (e.g., test input speech signal received), in one embodiment. The language specific emotion words-based dictionary can be created/generated and/or populated by the system 100 in real-time based on the input speech signal (e.g., test input speech signal) received, in another embodiment.

Below are the exemplary speech segments obtained from the text transcription, wherein the speech segments are identified as either emotion words-based speech segment or non-emotion words-based speech segment.

Text Transcription Segment 1: "When I got involved in the charity program, I got to understand the day to day life of these people."—non-emotion words-based speech segment Text Transcription Segment 2: "It made me sad."— emotion words-based speech segment Text Transcription Segment 3: "I felt angry that all these days they were ignored while we had the opportunity to make a difference." emotion words-based speech segment Text Transcription Segment 4: "Just talking to them made them happy."—emotion words-based speech segment Text Transcription Segment 5: "We then created this program where we have over 1000 volunteers who have earned the trust of patrons as well as the beneficiaries."—emotion words-based speech segment Text Transcription Segment 6: "The apprehensions of initial days are now replaced with joy and optimism."—emotion words-based speech segment.

Based on the underlined text in each speech segment, that specific speech segment is determined as emotion words-based speech segment. Else the speech segment is said to be determined as non-emotion words-based speech segment. So, in the above example, Text Transcription Segment 1 is determined as non-emotion words-based speech segment and the Text Transcription Segment 2 to segment 6 are determined to be emotion words-based speech segments.

At step 208 of the present disclosure, the one or more hardware processors 104 select one or more training segments (e.g., also referred as training speech segments and interchangeably used herein after) from the plurality of speech segments based on (i) one or more emotion words-based speech segments, or (ii) the one or more non-emotion the words-based speech segments. In the present disclosure, the system and method described herein selected one or more emotion words-based speech segments as one or more training segments (e.g., also referred as one or more training speech segments). It is to be understood by a person having ordinary skill in the art or person skilled in the art that the system and method may select one or more non-emotion words-based speech segments as one or ore training segments and such selection of either emotion words-based speech segments or non-emotion words-based speech segments as training segments shall not be construed as limiting the scope of the present disclosure. In one embodiment of the present disclosure, the one or more training segments comprise the one or more emotion words-based speech segments (e.g., refer text transcription segments 2 to 6). In another embodiment of the present disclosure, the one or more training segments comprise the one or more non-emotion words-based speech segments (e.g., text transcription segment 1).

At step 210 of the present disclosure, the one or more hardware processors 104 train one or more classifiers using the one or more selected training segments to obtain one or more trained classifiers. In an embodiment, the one or more classifiers comprise, but are not limited to Support Vector Machine (SVM Decision Trees (DT), Logistic Regression (LR), Gaussian Naive Bayes (GNB) modeling, One-vs-Rest (OvR) paradigm with the Multi-layer perceptron (OvR-MLP) and the eXtreme Gradient Boosted (XGB) classifier(s). Random Forrest (RF), Artificial Neural Networks (ANN), and the like. Example of SVM comprise support vector classifier (SVC) or linear support vector classifier (LSVC), in one embodiment. It is to be understood by a person having ordinary skill in the art or person skilled in the art that the above examples of the one or more classifiers shall not be construed as limiting the scope of the present disclosure.

The one or more trained classifiers of step 210 are used to predict/detect emotional valance of a test speech signal comprising speech segments not used as training segments for training the one or more classifiers. The predictions/emotional valence detection results are then compared to a ground truth to calculate the accuracy of the predictions/emotional valence detections. To measure the performance and/or accuracy of the one or more trained classifiers, system and method of the present disclosure may implement performance measuring parameters/technique(s) and/or accuracy measuring parameters/technique(s) as known in the art. Examples of such measuring technique(s)/parameters comprise, but are not limited to, Unweighted Average Recall (UAR), Weighted Average Recall (WAR), Geometric Mean (GM) which can be used for this comparison and determination of best classifier or optimal classifier amongst the one or more trained classifiers. The best classifier is chosen based on the comparison measure by comparing the predictions/emotional valence detection results of individual classifiers or a fusion of combination of two or more trained classifiers.

Once the one or more trained classifiers are obtained as an output, the one or more hardware processors 104 receive an input speech signal corresponding to one or more users (e.g., the one or more users as described in step 202 or a different set of users). The one or more hardware processors 104 execute the one or more classifiers, wherein the one or more classifiers when executed determine an emotional valence of the user using the input speech signal. In one embodiment of the present disclosure, the best performing classifier obtained in step 210 may be used to predict/determine/detect an emotional valance of a set of speech segments of the input test speech comprising a corresponding audio and corresponding text transcriptions of the one or more users. In another embodiment of the present disclosure, the best performing classifier obtained in step 210 may be used to predict/determine/detect an emotional valance of a set of speech segments of the input speech comprising an audio speech input of the one or more users. In an embodiment, the detected emotional valence may be categorized as Low (L), Medium (M: or Neutral), and High (H). In another embodiment, the detected emotional valence may be categorized from a scale of 1 to 10. It is to be understood by a person having ordinary skill in the art or person skilled in the art that the above examples of categorization of L, M, H or 1 to 10 shall not be construed as limiting the scope of the present disclosure. Majority voting across the predictions/emotional valence detections of the test speech segments is then evaluated and the corresponding valance is attributed to the input test speech (e.g., test speech sample).

Below is a pseudo code/algorithm for selection of training speech segments for training classifiers from input speech signals:

```
𝒯s ← { }
for n in {1, ..., N} (each signal in S) do
    flagSelect ← True
    for k in {0,1, ..., K_n} (each word in s_n) do
        if W_k^(n) ∈ ε (speech signal has an emotion word) then
            flagSelect ← False (do not select it)
            break (for-loop)
        end if
    end for
    if flagSelect is True (no emotion words in s_n) then
        𝒯s ← 𝒯s ∪ s_n
    end if
end for
```

The above pseudo code/algorithm can be better understood by way of following exemplary description. In the above pseudo code/algorithm, let a long speech sample S marked as a training example, have a valence $V_s$, and let S be split into N segments, $s_n$, $n \in \{1, \ldots, N\}$. Typically, but not always, $s_n \forall n$ are of the same length. By definition, the valence of $s_n$ is $V_s \forall n$. A text transcription for S can be obtained using manual or (semi-) automatic speech recognition technique as known in the art. For the ESC corpus, both manual and automatic transcriptions of each story are available (a story corresponds to the speech sample S). Let there be $K_n$ words in Segment $s_n$. These words are denoted as $w_k^{(n)}$, $k \in 1, 2, \ldots, K_n$. As mentioned, the above pseudo code/algorithm is used to obtain the selection of training segments 𝒯s from S; 𝒯s has no emotion words from ε. The complete training set, 𝒯, consists of selections of training segments obtained from all training speech samples $\mathcal{T} = \cup \mathcal{T}s$, FIG. 3, with reference to FIGS. 1 through 2, illustrates a graphical representation depicting performance measurement (unweighted average call—UAR) for the one or more classifiers, using the system 100 of FIG. 1, in accordance with an embodiment of the present disclosure. More specifically, FIG. 3 depicts a 5-fold cross validation score illustrating UAR for various approaches. With reference to FIG. 3, below is an exemplary experimental result showing performance of (trained) classifier, wherein the performance of the trained classifiers is measured by way of Unweighted Average Call. More specifically, below Table 1 depicts a 5-fold cross validation score for Decision Tree Classifier and Random Forest classifier.

EXPERIMENTAL RESULTS

TABLE 1

| Approach | Unweighted Average Call | |
|---|---|---|
| | Decision Tree | Random Forest |
| IncE | 0.43 | 0.48 |
| ExcE | 0.50 | 0.59 |
| ExcER | 0.51 | 0.59 |
| All (prior art) | 0.48 | 0.57 |

In the above Table 1, IncE refers to training speech segments comprising one or more emotion words. Alternatively, IncE refers to emotion words-based training speech segments. ExcE refers to training speech segments without emotion words. Alternatively, ExcE refers to non-emotion words-based training speech segments. ExcER refers to training speech segments with balanced dataset against emotion words-based speech segments to match the size of emotion words-based speech segments dataset. Alternatively, ExcER refers to training speech segments comprising speech segments by choosing 'x in every 'y' speech segments without emotion words, while ensuring that (nearly) all stories are represented. Each choice starts at a different offset (which ranges from 'a' to 'b'). In an embodiment of the present disclosure 'x' can be say of value 1 and 'y' can be a value greater than 'x' say 8. In another embodiment of the present disclosure, values of 'a' and 'b' are considered as 1 and 7, respectively. It is to be understood by a person having ordinary skill in the art or person skilled in the art that the above exemplary values of x, y, a, and b shall take any values depending on the implementation and type of input speech signal, associated text transcription, and the language specific emotion words dictionary, and such exemplary values shall not be construed as limiting the scope of the present disclosure. All refers to the entire set of training speech segments from the input speech signal.

Embodiments of the present disclosure provide system and method for selection of training speech segments for training one or more classifiers for detecting emotional valence from the input speech signals. Since the system and method of the present disclosure measure the performance of training classifier in terms of accuracy, this enhances the ability to accurately measure emotional valence from segments of speech signal which when tracked over time can be a marker of stress, anxiety, burnout, and the like. The present disclosure also helps in understanding the emotional state of an individual while engaged in a task or decision making. Depending on the language and culture, people express emotions differently while speaking. Typically, the choice of words, negation, and use of phonemes in certain fashion are methods employed to express the emotions, in which part of the speech the emotional valence manifests better is dependent on the language and culture. Conventionally, there exist methods that either use the text transcripts of the audio or acoustic features of the entire audio. System and method of the present disclosure consider only specific speech segments of the input speech signal based on a dictionary specific to a language to assess emotional valence. More specifically, method of the present disclosure uses a model trained (or trained classifier) for specific language either by including the acoustic features of the emotion related words or by omitting it. Acoustic features refer to features that are derived from short frames of speech signal/speech segment(s). The relevant features and whether to include or exclude is learned by virtue of a multitude of experiments and validations (e.g., refer Table 1 and graphical representation depicted in FIG. 3).

The written description describes the subject matter herein to enable any person skilled in the art to make and use the embodiments. The scope of the subject matter embodiments is defined herein and may include other modifications that occur to those skilled in the art. Such other modifications are intended to be within the scope of the present disclosure if they have similar elements that do not differ from the literal language of the embodiments or if they include equivalent elements with insubstantial differences from the literal language of the embodiments described herein.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the Ike, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method, comprising:
   obtaining, via one or more hardware processors, (i) a speech signal corresponding to one or more users, and (ii) a corresponding text transcription from the speech signal;
   splitting; via the one or more hardware processors, the speech signal to a plurality of speech segments;
   determining, via the one or more hardware processors, one of (i) one or more emotion words-based speech segments, or (ii) one or more non-emotion words-based speech segments from the plurality of speech segments based on (a) the speech signal, (b) the obtained text transcription, and (c) a language specific emotion words-based dictionary;
   selecting, via the one or more hardware processors, one or more training segments from the plurality of speech segments based on (i) one or more emotion words-based speech segments, or (ii) the one or more non-emotion the words-based speech segments;
   training, via the one or more hardware processors, one or more classifiers using the one or more selected training segments to obtain one or more trained classifiers;
   measuring, via the one or more hardware processors, an accuracy of the trained one or more classifiers to determine an optimal trained classifier among the trained one or more classifiers, wherein
      the accuracy of the trained one or more classifiers using one or more accuracy measuring techniques, and
      the one or more accuracy measuring techniques includes an Unweighted Average Recall (UAR), a Weighted Average Recall (WAR), a Geometric Mean (GM);
   detecting, via the one or more hardware processors, an emotional valance of a specific speech signal, wherein the emotional valance of the specific speech signal is detected by using the determined optimal trained classifier, wherein the specific speech signal is different from the speech signal;
   comparing, via the one or more hardware processors, the detected emotional valance of the specific speech with a ground truth valance;
   calculating, via the one or more hardware processors, an accuracy of the detected emotional valence, wherein the accuracy of the detected emotional valence is calculated based on the comparison; and
   categorizing, via the one or more hardware processors, the detected emotional valance of the specific speech signal into a Low valence, a Medium valence, and a High valence.

2. The processor implemented method of claim 1, wherein the one or more training segments comprises the one or more emotion words-based speech segments.

3. The processor implemented method of claim 1, wherein the one or more training segments comprises the one or more non-emotion words-based speech segments.

4. A system, comprising:
   a memory storing instructions;
   one or more communication interfaces; and
   one or more hardware processors coupled to the memory via the one or more communication interfaces, wherein the one or more hardware processors are configured by the instructions to:

obtain (i) a speech signal corresponding to one or more users, and (ii) a corresponding text transcription from the speech signal;

split the speech signal to a plurality of speech segments;

determine one of (i) one or more emotion words-based speech segments, or (ii) one or more non-emotion words-based speech segments from the plurality of speech segments based on (a) the speech signal, (b) the obtained text transcription, and (c) a language specific emotion words-based dictionary;

select one or more training segments from the plurality of speech segments based on (i) one or more emotion words-based speech segments, or (ii) the one or more non-emotion the words-based speech segments;

train one or more classifiers using the one or more selected training segments to obtain one or more trained classifiers;

measure an accuracy of the trained one or more classifiers to determine an optimal trained classifier among the trained one or more classifiers, wherein the accuracy of the trained one or more classifiers using one or more accuracy measuring techniques, and the one or more accuracy measuring techniques includes an Unweighted Average Recall (UAR), a Weighted Average Recall (WAR), a Geometric Mean (GM);

detect an emotional valance of a specific speech signal, wherein the emotional valance of the specific speech signal is detected by using the determined optimal trained classifier, wherein the specific speech signal is different from the speech signal;

compare the detected emotional valance of the specific speech with a ground truth valance;

calculate an accuracy of the detected emotional valence, wherein the accuracy of the detected emotional valence is calculated based on the comparison; and categorize the detected emotional valance of the specific speech signal into a Low valence, a Medium valence, and a High valence.

5. The system of claim 4, wherein the one or more training segments comprises the one or more emotion words-based speech segments.

6. The system of claim 4, wherein the one or more training segments comprises the one or more non-emotion words-based speech segments.

7. One or more non-transitory machine-readable information storage mediums comprising one or more instructions which when executed by one or more hardware processors cause a method for selection of speech segments for training classifiers for detecting emotional valence from input speech signals by:

obtaining, via the one or more hardware processors, (i) a speech signal corresponding to one or more users, and (ii) a corresponding text transcription from the speech signal;

splitting, via the one or more hardware processors, the speech signal to a plurality of speech segments;

determining, via the one or more hardware processors, one of (i) one or more emotion words-based speech segments, or (ii) one or more non-emotion words-based speech segments from the plurality of speech segments based on (a) the speech signal, (b) the obtained text transcription, and (c) a language specific emotion words-based dictionary;

selecting, via the one or more hardware processors, one or more training segments from the plurality of speech segments based on (i) one or more emotion words-based speech segments, or (ii) the one or more non-emotion the words-based speech segments;

training, via the one or more hardware processors, one or more classifiers using the one or more selected training segments to obtain one or more trained classifiers;

measuring, via the one or more hardware processors, an accuracy of the trained one or more classifiers to determine an optimal trained classifier among the trained one or more classifiers, wherein the accuracy of the trained one or more classifiers using one or more accuracy measuring techniques, and the one or more accuracy measuring techniques includes an Unweighted Average Recall (UAR), a Weighted Average Recall (WAR), a Geometric Mean (GM);

detecting, via the one or more hardware processors, an emotional valance of a specific speech signal, wherein the emotional valance of the specific speech signal is detected by using the determined optimal trained classifier, wherein the specific speech signal is different from the speech signal;

comparing, via the one or more hardware processors, the detected emotional valance of the specific speech with a ground truth valance;

calculating, via the one or more hardware processors, an accuracy of the detected emotional valence, wherein the accuracy of the detected emotional valence is calculated based on the comparison; and categorizing the detected emotional valance of the specific speech signal into a Low valence, a Medium valence, and a High valence.

8. The one or more non-transitory machine-readable information storage mediums of claim 7, wherein the one or more training segments comprises the one or more emotion words-based speech segments.

9. The one or more non-transitory machine-readable information storage mediums of claim 7, wherein the one or more training segments comprises the one or more non-emotion words-based speech segments.

* * * * *